United States Patent
Asatani et al.

(10) Patent No.: US 8,896,689 B2
(45) Date of Patent: Nov. 25, 2014

(54) ENVIRONMENT RECOGNITION APPARATUS

(71) Applicants: Honda Motor Co., Ltd., Tokyo (JP); Tokyo Institute of Technology, Tokyo (JP)

(72) Inventors: Minami Asatani, Wako (JP); Masatoshi Okutomi, Tokyo (JP); Shigeki Sugimoto, Tokyo (JP)

(73) Assignees: Honda Motor Co., Ltd., Tokyo (JP); Tokyo Institute of Technology, Tokyo (JP)

( * ) Notice: Subject to any disclaimer, the term of this patent is extended or adjusted under 35 U.S.C. 154(b) by 220 days.

(21) Appl. No.: 13/693,719

(22) Filed: Dec. 4, 2012

(65) Prior Publication Data
US 2013/0141546 A1 Jun. 6, 2013

(30) Foreign Application Priority Data
Dec. 6, 2011 (JP) .................................. 2011-267169

(51) Int. Cl.
*H04N 13/02* (2006.01)
*G06T 7/00* (2006.01)

(52) U.S. Cl.
CPC .......... *H04N 13/0242* (2013.01); *G06T 7/0042* (2013.01); *G06T 2207/10012* (2013.01); *G06T 2207/10028* (2013.01)
USPC .............................. 348/139; 348/48; 348/135

(58) Field of Classification Search
USPC ........................................... 348/48, 135, 139
See application file for complete search history.

(56) References Cited

U.S. PATENT DOCUMENTS

2009/0046924 A1* 2/2009 Morimitsu .................... 382/154

FOREIGN PATENT DOCUMENTS

| JP | 09-005050 | 1/1997 |
|---|---|---|
| JP | 2006-331108 | 12/2006 |
| JP | 2007-081806 | 3/2007 |
| JP | 2007-263669 | 10/2007 |
| JP | 2008-123019 | 5/2008 |
| JP | 2009-186287 | 8/2009 |
| JP | 2011-013803 | 1/2011 |
| JP | 2011-203148 | 10/2011 |

OTHER PUBLICATIONS

German Office Action with English Translation dated Nov. 22, 2013, 12 pages.

(Continued)

*Primary Examiner* — Sath V Perungavoor
*Assistant Examiner* — Jeffery Williams
(74) *Attorney, Agent, or Firm* — Rankin, Hill & Clark LLP

(57) ABSTRACT

An apparatus capable of improving the estimation accuracy of information on a subject including a distance up to the subject is provided. According to an environment recognition apparatus 1 of the present invention, a first cost function is defined as a decreasing function of an object point distance Z. Thus, the longer the object point distance Z is, the lower the first cost of a pixel concerned is evaluated. This reduces the contribution of the first cost of a pixel highly probable to have a large measurement or estimation error of the object point distance Z to the total cost C. Thereby, the estimation accuracy of a plane parameter ^q representing the surface position and posture of the subject is improved.

7 Claims, 6 Drawing Sheets

(56) References Cited

OTHER PUBLICATIONS

Badino, et al., "Integrating LIDAR into Stereo for Fast and Improved Disparity Computation", 3D Imaging, Modelling, Processing, Visualization and Transmission (3DIMPVT), 2011 International Conference on May 16-19, 2011, p. 405-412, 8 pages.

Japanese Decision to Grant dated Feb. 18, 2014.

"Lukas-Kanade 20 years on: A Unifying Framework Part 1: The Quantity Approximated, the Warp Update Rule, and the Gradient Descent Approximation", S. Baker and I Matthews, International Journal of Computer Vision (2004) Volume: 56, Issue: 3, pp. 221-255. Discussed on p. 1 of specification.

"Fusion of Time-of-Flight Depth and Stereo for High Accuracy Depth maps", JieJie Zhu, et al. IEEE (2008). Discussed on p. 1 of specification.

* cited by examiner

ENVIRONMENT RECOGNITION APPARATUS

BACKGROUND OF THE INVENTION

1. Field of the Invention

The present invention relates to an apparatus which estimates a distance or the like up to a subject by using a range image sensor and two image sensors.

2. Description of the Related Art

There is suggested a method of estimating a plane parameter and a distance according to a gradient method on the basis of luminance information which is acquired from a stereo camera (Refer to Non-patent Document 1: "Lukas-Kanade 20 Years On: A Unifying Framework Part 1: The Quantity Approximated, the Warp Update Rule, and the Gradient Descent Approximation," S. Baker and I Matthews, International Journal of Computer Vision [2004] Volume: 56, Issue: 3, Pages: 221-255).

There is also suggested a method of estimating a range image by merging a range image acquired by a range image sensor and images acquired by individual stereo cameras (Refer to Non-patent Document 2: "Fusion of Time-of-Flight Depth and Stereo for High Accuracy Depth Maps," JieJie Zhu, et al. IEEE [2008]).

Specifically, the total likelihood is computed on the basis of the distance likelihood and the luminance likelihood and the distance candidate value having the highest total likelihood among a plurality of distance candidate values is estimated as a distance true value at each pixel of the range image.

The weights of the distance likelihood and the luminance likelihood are determined according to an empirical rule, independently of whether the distance up to a subject is long or short. Accordingly, an influence of the information on a long distance which causes a large measurement error is reflected on the total likelihood to an unignorable degree, by which distance estimation accuracy is likely to decrease.

Therefore, it is an object of the present invention to provide an apparatus capable of improving the estimation accuracy of the subject information including a distance up to a subject.

SUMMARY OF THE INVENTION

The present invention relates to an apparatus which estimates a position and a posture of a surface of a subject by using: a range image sensor configured to measure a distance up to the subject; a standard image sensor configured to acquire a standard image composed of a plurality of pixels each having a specified physical quantity of the subject as a pixel value by imaging the subject; and a reference image sensor configured to acquire a reference image composed of a plurality of pixels each having the specified physical quantity of the subject as a pixel value by imaging the subject.

According to a first aspect of the invention, there is provided an environment recognition apparatus including: a first processing element configured to calculate first cost using a first cost function defined as a multivariate function which is an increasing function with respect to a first deviation and a decreasing function with respect to an object point distance, for each pixel belonging to the object region which is at least a part of the standard image, on the basis of the first deviation, which is determined according to the length of an interval between a real point whose position is measured by the range image sensor as a distance measured value and a virtual point as a result of projecting the real point onto a virtual surface with respect to an eye direction of the standard image sensor, and the object point distance, which is a distance between the standard image sensor and an object point which is one of the real point and the virtual point with respect to an optical axis direction of the standard image sensor; a second processing element configured to calculate second cost using a second cost function which is an increasing function with respect to a second deviation, for each pixel belonging to the object region of the standard image, on the basis of the second deviation as a deviation between the pixel value of the pixel in the standard image and the pixel value of the pixel in the reference image and the pixel value of the pixel of the reference image corresponding to the pixel of the standard image according to the position and posture of the virtual surface; and a third processing element configured to estimate the position and posture of the surface of the subject by exploring the virtual surface so that total cost which is a total sum of the first cost and the second cost with respect to each pixel belonging to the object region of the standard image is brought close to the minimum value of the total cost.

According to the environment recognition apparatus of the first aspect of the invention, the first cost function is defined as the decreasing function with respect to the object point distance. Therefore, the longer the object point distance is, the lower the first cost of the pixel concerned is evaluated. This reduces the contribution of the first cost of a pixel highly probable to have a large measurement or estimation error of the object point distance to the total cost. Thereby, the estimation accuracy of the subject information including the distance up to the subject is improved.

In the environment recognition apparatus according to the first aspect of the invention, preferably the first cost function is defined as an increasing function with respect to an accuracy of a measurement of a distance up to the subject obtained by the range image sensor, and the first processing element is configured to recognize the accuracy of the measurement of the distance and to calculate the first cost on the basis of the first deviation, the object point distance, and the accuracy, according to the first cost function.

In the environment recognition apparatus according to the first aspect of the invention, preferably the second cost function is defined as an increasing function with respect to an accuracy of a measurement of a pixel value obtained by at least one of the standard image sensor and the reference image sensor, and the second processing element is configured to recognize the accuracy of the measurement of the pixel value and to calculate the second cost on the basis of at least the second deviation and the accuracy, according to the second cost function.

In the environment recognition apparatus according to the first aspect of the invention, preferably the third processing element is configured to estimate the position and posture of the surface of the subject according to a least-squares method.

According to a second aspect of the invention, there is provided an environment recognition apparatus which estimates the position and posture of a surface of a subject by using: a range image sensor configured to measure a distance up to the subject; a standard image sensor configured to acquire a standard image composed of a plurality of pixels each having a specified physical quantity of the subject as a pixel value by imaging the subject; and a reference image sensor configured to acquire a reference image composed of a plurality of pixels each having the specified physical quantity of the subject as a pixel value by imaging the subject, the environment recognition apparatus including: a first processing element configured to compute a first deviation on the basis of a parallax residual error, which is a deviation between a pixel position obtained by projecting the pixel position of the standard image sensor corresponding to the distance measured value onto the reference image sensor and a pixel position obtained by projecting the pixel position of the standard image sensor corresponding to a distance candidate value onto the reference image sensor, according to a restraint condition that the specified physical quantity acquired by the standard image sensor and the reference image sensor at the same position on the image is identical, with respect to each of a plurality of pixel positions of a range image acquired by the range image sensor; a second processing element configured to acquire the pixel value of a pixel in the reference image corresponding to a pixel in the standard image according to the parallax, and to compute a second deviation of the specified physical quantity which is a pixel value of each of a plurality of pixels in the standard image and the reference image, based on the assumption that the standard image sensor and the reference image sensor have parallax according to the distance candidate value; and a third processing element configured to compute a divergence between the standard image and the reference image on the basis of the first deviation computed by the first processing element and the second deviation computed by the second processing element and to estimate the distance candidate value among a plurality of the distance candidate values, that minimizes the divergence as a distance true value at each pixel of the range image.

According to the environment recognition apparatus of the second aspect of the invention, the first deviation is computed according to the universal condition, "the specified physical quantity at the same place is identical on images acquired at the same or substantially the same clock time by the standard image sensor and the reference image sensor." Accordingly, comparing with the case where the likelihood of the distance candidate value is evaluated based on the evaluation function designed on the basis of an empirical rule, a distance true value, consequently the estimation accuracy of the range image is able to be improved.

In the environment recognition apparatus according to the second aspect of the invention, preferably the first processing element computes the first deviation by performing a transformation from the parallax residual error to a deviation in the specified physical quantity.

In the environment recognition apparatus according to the second aspect of the invention, preferably the first processing element computes the first deviation by performing the transformation through multiplying the parallax residual error by a gradient of the specified physical quantity along the epipolar line direction.

DESCRIPTION OF THE PREFERRED EMBODIMENTS (Configuration)

Figure 1:
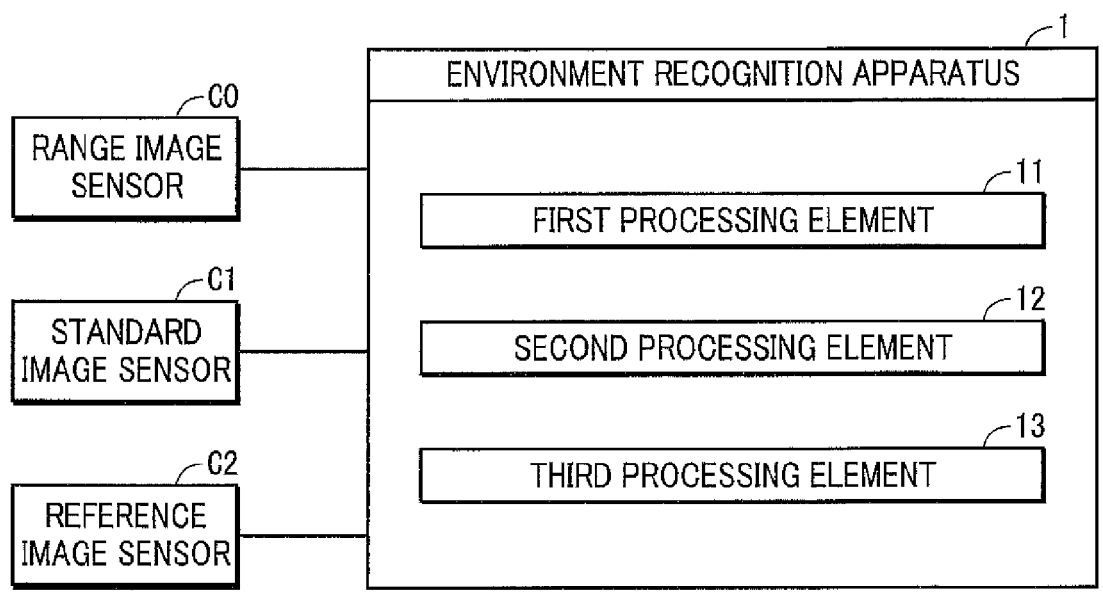
FIG. 1 is a configuration explanatory diagram illustrating an environment recognition apparatus as an embodiment of the present invention.

An environment recognition apparatus 1 illustrated in FIG. 1 includes a range image sensor C0, a standard image sensor C1, and a reference image sensor C2. The environment recognition apparatus 1 is mounted on a moving apparatus such as, for example, a vehicle or a legged mobile robot and is used to recognize the environment of the moving apparatus.

The range image sensor C0 is, for example, a Time-of-Flight (TOF) range image sensor and acquires a primary range image where each pixel has a distance measured value $Ds'$ (See FIG. 4) as a pixel value. Imaging elements arrayed on an imaging surface or a flat surface of the range image sensor C0 define the "primary range image coordinate system."

The standard image sensor C1 is one camera (for example, the left camera) of visible light stereo cameras and acquires a standard image where each pixel has at least luminance (specified physical quantity) as a pixel value. The optical axis direction of the standard image sensor C1 is defined as the Z-axis direction (See FIG. 4). Imaging elements which are arrayed on an imaging surface or a flat surface of the standard image sensor C1 define the "standard image coordinate system." The horizontal direction of the standard image coordinate system is defined as the X-axis direction and the vertical direction is defined as the Y-axis direction.

The reference image sensor C2 is the other camera (for example, the right camera) of the visible light stereo cameras and acquires a reference image where each pixel has at least luminance as a pixel value similarly to the standard image. Imaging elements which are arrayed on an imaging surface or a flat surface of the reference image sensor C2 define the "reference image coordinate system."

Camera parameters (an internal parameter and an external parameter) of the range image sensor C0, the standard image sensor C1, and the reference image sensor C2 are known and are stored in a memory of a computer constituting the environment recognition apparatus 1. For example, a rotation matrix and a translation matrix, which represent coordinate transformation between the primary range image coordinate system and the standard image coordinate system, or a quaternion equivalent thereto are stored in the memory. Similarly, a rotation matrix and a translation matrix, which represent coordinate transformation between the standard image coordinate system and the reference image coordinate system, or a quaternion equivalent thereto are stored in the memory.

In the case where the environment recognition apparatus 1 is mounted on a robot, the position and posture in the primary range image coordinate system, the standard image coordinate system, and the reference image coordinate system with respect to the robot coordinate system are computed according to a forward kinematics model, which represents a behavior of the robot, and then stored in the memory.

In the robot coordinate system, the center of mass (for example, included in the base) of the robot is defined as the origin, the upside of the robot is defined as the +x direction, the right hand is defined as the +y direction, and the front side is defined as the +z direction. The position and posture of the robot coordinate system in the world coordinate system are defined according to, for example, the action plan of the robot.

The environment recognition apparatus 1 is composed of a programmable computer and includes a first processing element 11, a second processing element 12, and a third processing element 13 configured to perform arithmetic processing, which is described later, for an image concerned. The three processing elements 11 to 13 each may be composed of a single computer or be composed of a plurality of computers physically independent of each other.

The wording such that each processing element is "configured" to perform arithmetic processing assigned to the processing element means that the arithmetic processing unit such as a CPU constituting each processing element is "programmed" so as to read software in addition to required information from the memory such as a ROM, RAM, or the like or from a recording medium and then to perform arithmetic processing according to the software for the information concerned.

(Functions)

An environment recognition method which is performed by the environment recognition apparatus 1 having the above configuration will be described below.

Figure 2:
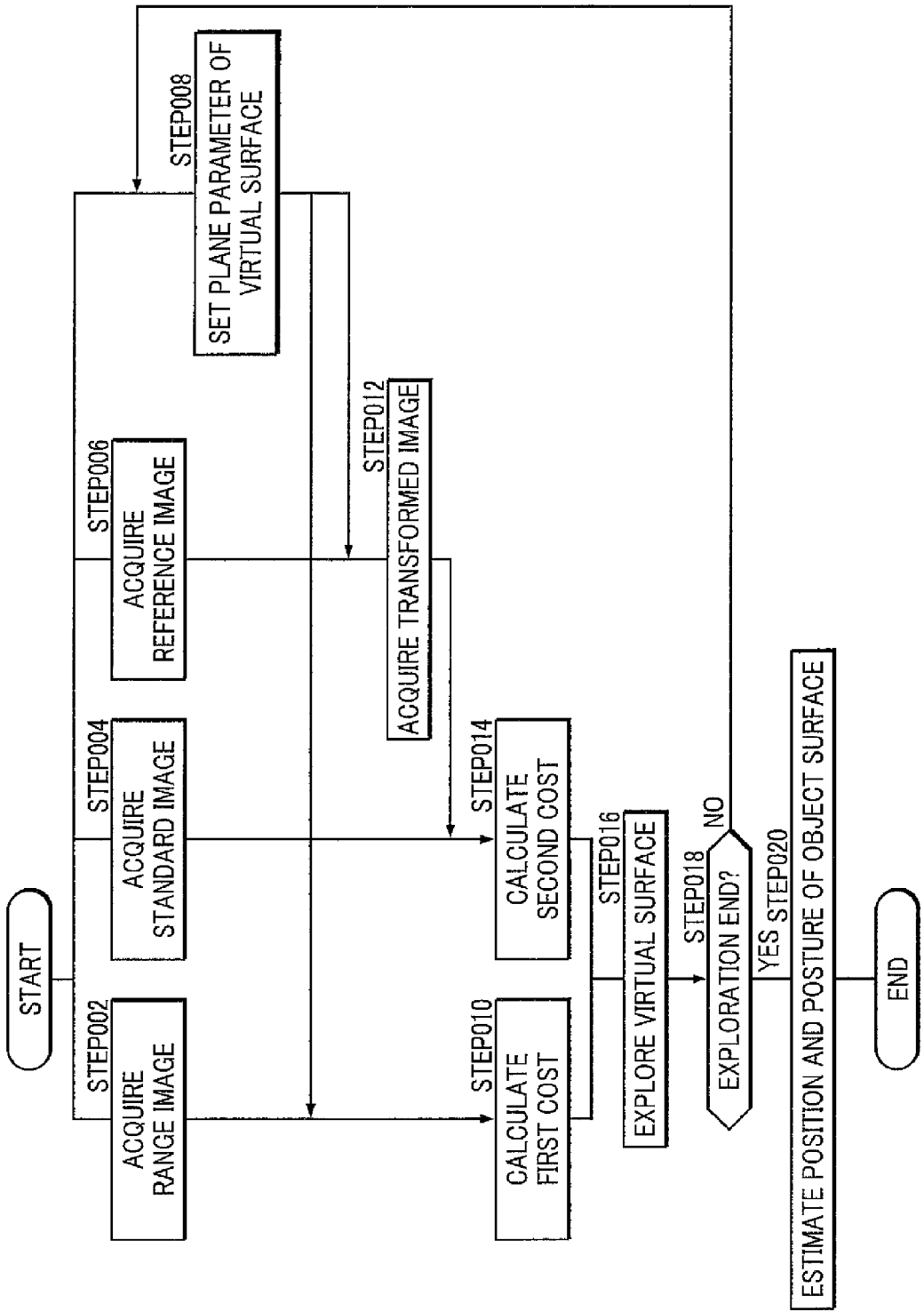
FIG. 2 is a diagram illustrating a flowchart of an environment recognition method as an embodiment of the present invention.

The environment recognition apparatus 1 acquires a "secondary range image" which is composed of a plurality of pixels each having a distance measured value Ds [s] acquired by the range image sensor C0 as a pixel value (STEP 002 in FIG. 2). Here, "s" means a pixel position (the position of a quantized point) included in the object region or a region of interest (ROI) in a standard image and to which the distance measured value Ds is assigned among the pixel positions in the standard image coordinate system, and more accurately means the coordinate value of the pixel position.

More specifically, first, the environment recognition apparatus 1 acquires the "primary range image" which is composed of a plurality of pixels s' each having a distance measured value Ds' up to the subject (See FIG. 4) acquired by the range image sensor C0 as a pixel value. Then, the pixel value corresponding to the distance measured value Ds' in each pixel position in the primary range image coordinate system is assigned to each pixel position u in the standard image coordinate system, by which the secondary range image is acquired.

Figure 3:
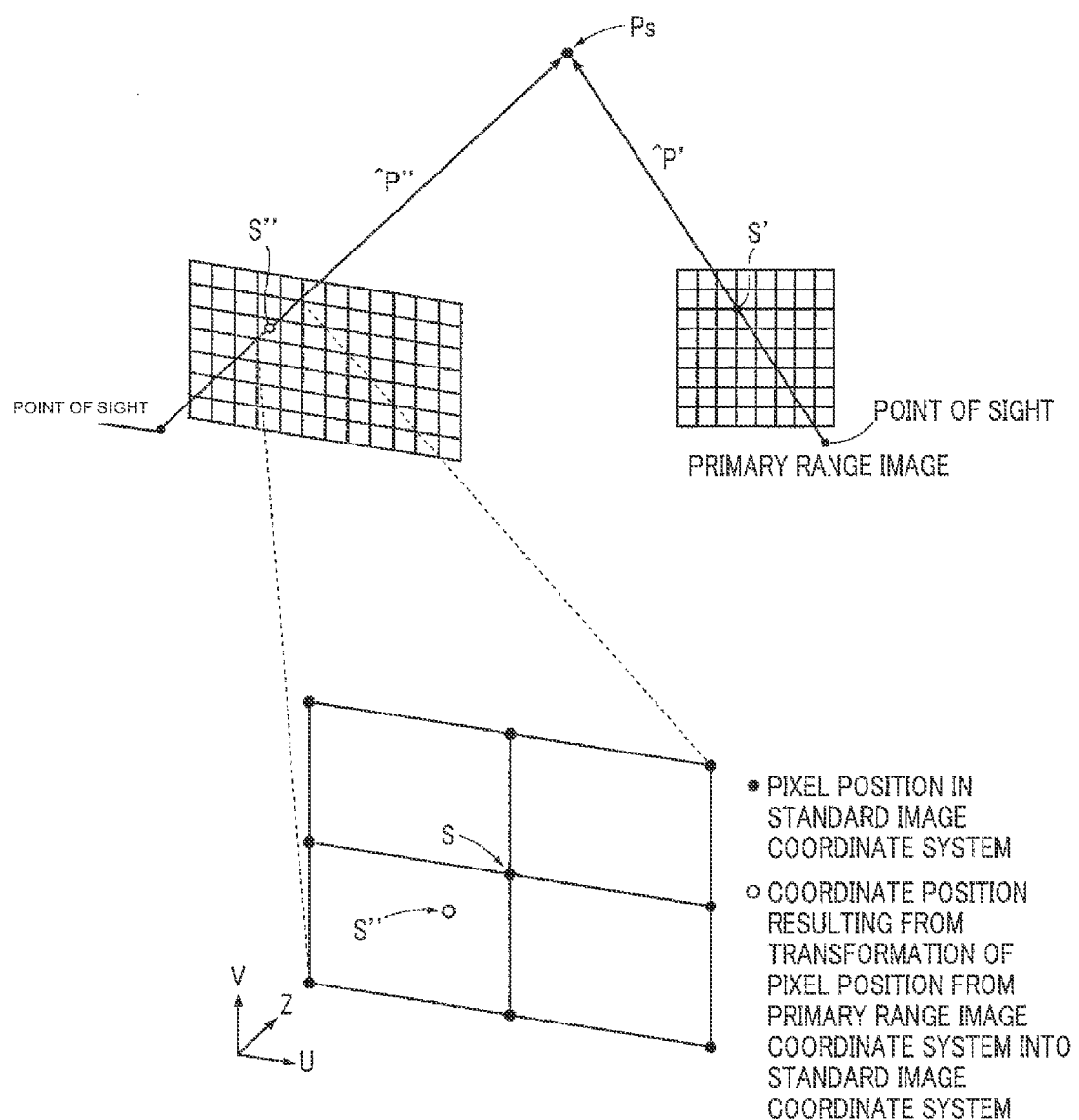
FIG. 3 is an explanatory diagram of a correlation between a standard image coordinate system and a range image coordinate system.

Specifically, as illustrated in FIG. 3, a point position s" is obtained as a result that the pixel position s' in the primary range image coordinate system is coordinate-transformed into the standard image coordinate system. The position of the observation point Ps based on the primary range image coordinate system is represented by a vector $\hat{p}'=D_s'\hat{e}'(s')$. "^" indicates a vector (the same applies hereinafter). "$\hat{e}'(s')$" is a unit vector representing the eye direction of the range image sensor C0 passing through the pixel position s' in the primary range image coordinate system.

A vector $\hat{p}''=R\hat{p}'+T$, which represents the position of the observation point Ps based on the standard image coordinate system, is computed on the basis of a rotation matrix R and a translation matrix T representing a coordinate transformation from the primary range image coordinate system to the standard image coordinate system. The rotation matrix R and the translation matrix T are stored in the memory in advance. The rotation matrix R and the translation matrix T may be defined using a quaternion, which is mathematically equivalent thereto.

A coordinate position $s'''=(1/Zs'')\hat{p}''$ corresponding to the observation point Ps in the standard image coordinate system is obtained on the basis of the vector $\hat{p}''$ and the depth-direction component thereof Zs" (a Z-direction component perpendicular to the standard image coordinate system which is the X-Y coordinate system).

The coordinate position s" (See a white circle in FIG. 3) generally does not coincide with the pixel position s (See a black circle in FIG. 3) in the standard image coordinate system. Therefore, a distance (real point distance) Zs, which is determined on the basis of a distance Zs" corresponding to the coordinate position s", is assigned to each pixel position s in the standard image coordinate system according to a publicly-known interpolation method such as the nearest neighbor interpolation method, the bi-linear interpolation method, or the bicubic spline method.

Then, a norm Ds(s) of a vector $\hat{p}=Ds\hat{e}(s)$ which represents the position of the observation point Ps based on the secondary range image coordinate system is assigned as a pixel value to each pixel position s in the standard image coordinate system. "$\hat{e}(s)$" is a unit vector representing the eye direction of the range image sensor C0 passing through the pixel position s in the secondary range image coordinate system.

There is no need, however, to assign distance measured values to all pixel positions in the standard image coordinate system in consideration of a difference in resolution or the like between the range image sensor C0 and the standard image sensor C1. Thereby, the secondary range image is acquired.

In addition, a "standard image" composed of a plurality of pixels each having at least luminance as a pixel value is acquired through the standard image sensor C1 (STEP 004 in FIG. 2).

Furthermore, a "reference image" composed of a plurality of pixels each having at least luminance as a pixel value similarly to the standard image is acquired through the reference image sensor C2 (STEP 006 in FIG. 2).

A series of processes described below are performed for a secondary range image, a standard image, and a reference image at the same clock time, which have been acquired at the same clock time and stored in the memory. In the case where the range image sensor C0, the standard image sensor C1, and the reference image sensor C2 are not completely synchronized with each other, a secondary range image, a standard image, and a reference image at slightly different clock times or at substantially the same clock time may be acquired as those at the same clock time.

First, for the pixel position s in the standard image coordinate system, a virtual surface (flat surface) is set (STEP 008 in FIG. 2). Specifically, a plane parameter $\hat{q}$ is set which is defined by a vector $\hat{n}/d$ representing the position and posture of the virtual surface. While the initial value of the plane parameter $\hat{q}$ may be arbitrary, the current value thereof is set by modifying the previous value of the plane parameter $\hat{q}$ as described later. "n" is a unit normal vector on the virtual surface (See FIG. 4). "d" is a distance from an imaging element of the standard image sensor C1 to the virtual surface (See FIG. 4).

The first processing element 11 calculates "first cost" according to a first cost function $f_1$ on the basis of a first deviation $e_1$ which is determined according to whether the interval |Ds−Dc| between the real point Ps and the virtual point Pc is long or short (STEP 012 in FIG. 2).

Figure 4:
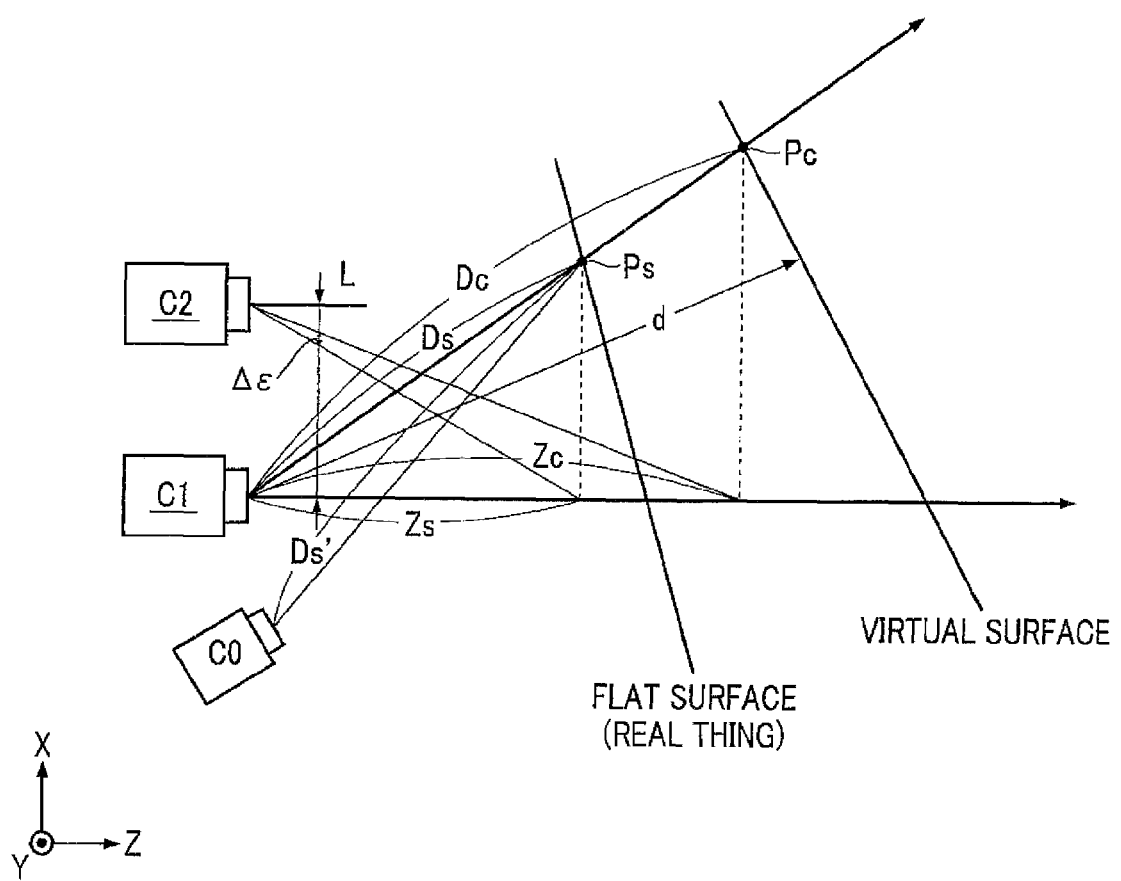
FIG. 4 is an explanatory diagram of a real point, a virtual surface, and a virtual point.

As illustrated in FIG. 4, the term "real point" means a point $Ps=(1/Ds)\hat{s}$ whose real space position is determined according to the pixel value Ds(s) of the pixel position s=(u, v) in the secondary range image coordinate system. Moreover, the term "virtual point" means a point obtained by projecting the real point Ps on the virtual surface from the pixel position $\hat{s}$ with respect to the direction of the pixel value Ds(s) (the eye direction of the standard image sensor C1).

As the first deviation $e_1$, a deviation |Zs−Zc| between a real point distance Zs and a virtual point distance Zc is used. The real point distance Zs is a distance between the standard image sensor C1 and the real point Ps with respect to the optical axis direction (Z direction) of the standard image sensor C1. The virtual point distance Zc is a distance between the standard image sensor C1 and the virtual point Pc (See FIG. 4).

In addition, various distances uniquely determined from the geometric relationship depending on whether the interval |Ds−Dc| between the real point Ps and the virtual point Pc is long or short may be used as the first deviation $e_1$. For example, besides the interval |Ds−Dc|, an interval between a point resulting from projecting the real point Ps on the virtual surface with respect to the Z direction and the virtual point Pc with respect to the specified direction may be used as the first deviation $e_1$. Moreover, an interval between a point resulting from projecting the virtual point Pc on a flat surface corresponding to the subject with respect to the Z direction and the real point Ps with respect to the specified direction may be used as the first deviation $e_1$.

The first cost function $f_1$ is a continuous or stepwise increasing function with the first deviation $e_1$ as a variable. In other words, a relational expression, $(\partial f_1/\partial c_1)>0$ or $f_1(e_1+\delta e_1)-f1(e_1)>0(\delta e_1>0)$, is satisfied. The first cost function $f_1$ is defined according to, for example, a relational expression (10).

$$f_1(e_1)=\Sigma_s e_1^2(s) \qquad (10)$$

"Σs" indicates a sum in the secondary range image coordinate system. The first deviation $e_1$ is a function with the plane parameter $\hat{q}=\hat{n}/d$ on the virtual surface as a variable, and therefore the first cost computed on the basis of the first deviation $e_1$ is a function with the plane parameter $\hat{q}$ of the virtual surface as a variable.

The first cost function $f_1$ may be a multivariate function with the object point distance Z, which is one of the real point distance Zs and the virtual point distance Zc, as a variable, in addition to the first deviation $e_1$. The first cost function $f_1$ is defined as a decreasing function with respect to the object point distance Z. In this case, the first cost function $f_1$ is defined according to, for example, a relational expression (11):

$$f_1(e_1,Z)=\Sigma_s g_1(Z(s))e_1^2(s),$$

$$g_1(Z)=1/Z^n (n>0, \text{for example}, n=1 \text{ or } 2) \qquad (11)$$

The first cost function $f_1$ defined according to the relational expression (11) has behavior characteristics to the object point distance Z which are at least partially identical or approximate to the behavior characteristics of the parallax residual error Δu of the standard image sensor C1 and the reference image sensor C2, as described below. Therefore, it is understood that the first cost function $f_1$ is defined in an appropriate form in view of the geometric relationship uniquely determining the parallax residual error Δu. Then, description is made below on this point.

Figure 5A:
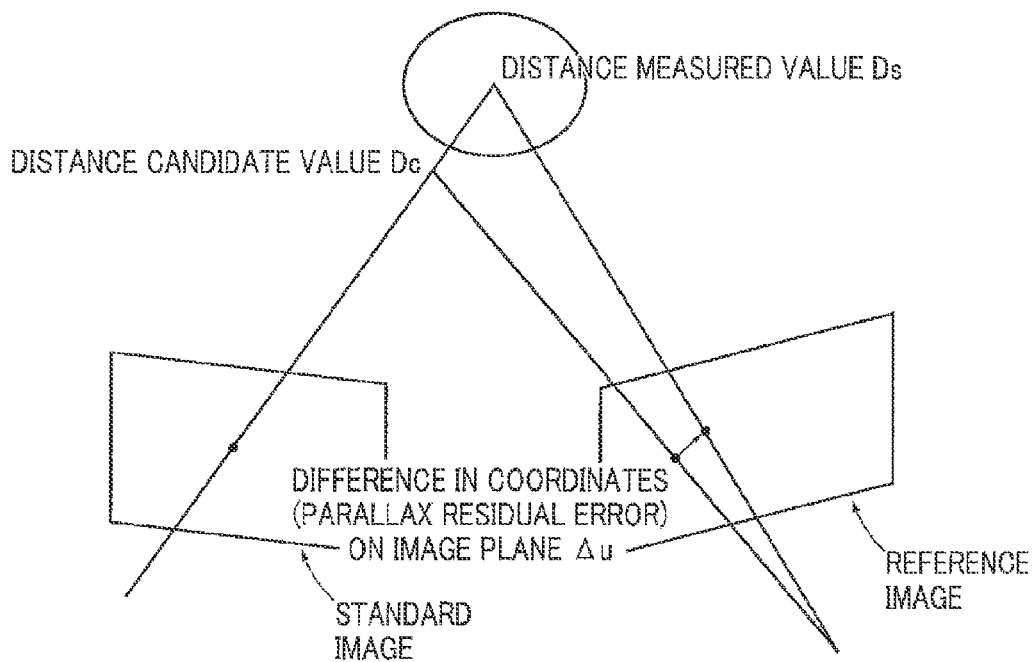
FIGS. 5A and 5B are explanatory diagrams of a relationship between the standard image coordinate system and a reference image coordinate system.

For ease of description, here, it is assumed that there is provided parallel stereo arrangement in which the standard image sensor C1 and the reference image sensor C2 with identical internal parameters are arranged so as to have the optical axes parallel to each other. Unless the standard image sensor C1 and the reference image sensor C2 are set in the parallel stereo arrangement, as illustrated in FIG. 5A, the parallax residual error Δu is a difference in each pixel position between the distance measured value Ds and the distance candidate value Dc projected on the reference image sensor C2.

The parallax residual error Δu is defined according to a relational expression (111) on the basis of the real point distance Zs, the virtual point distance Zc, and a base-line length L between the image sensors C1 and C2 (See FIG. 4).

$$\Delta u=L\{(1/Zs)-(1/Zc)\} \qquad (111)$$

Figure 5B:
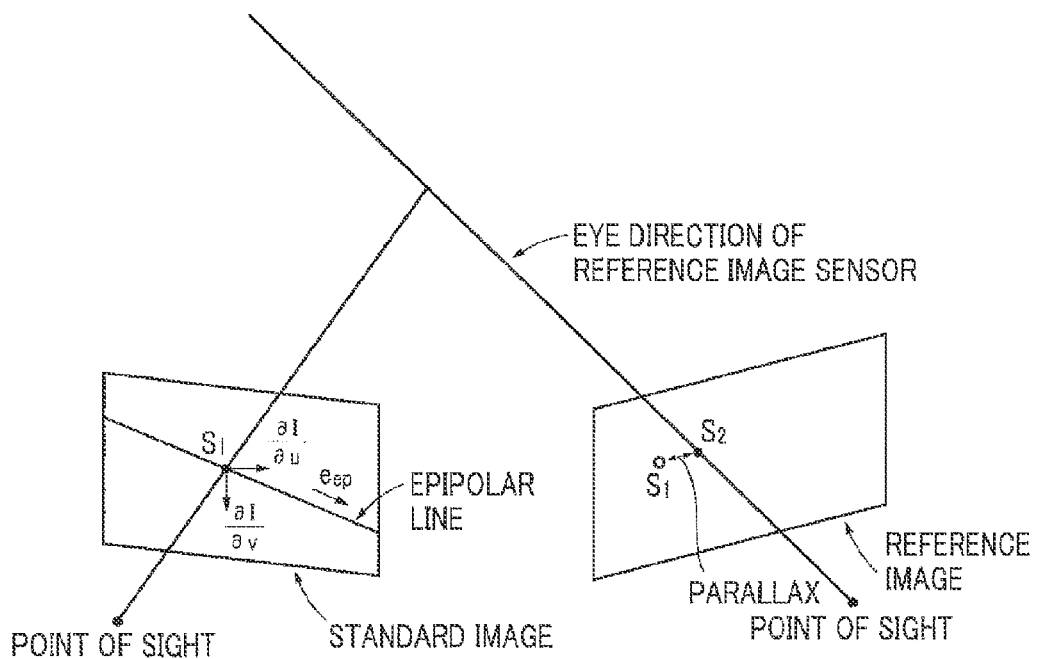

"u" is a coordinate value representing a position in the horizontal direction in the standard image coordinate system (or the reference image coordinate system). In the case of parallel stereo, the direction of the u axis is parallel to an epipolar line. An error ΔI of luminance between the standard image and the reference image under the assumption that a parallax residual error Δu exists is expressed by a relational expression (112) in consideration of an epipolar restraint condition (See FIG. 5B).

$$\Delta I=(\partial I/\partial u)\hat{e}_{ep}\Delta u \qquad (112)$$

"$\hat{e}_{ep}$" is a unit vector representing the direction of the epipolar line in the standard image coordinate system. Here, $(\partial I/\partial u)$ is a vector representing a luminance gradient and "$(\partial I/\partial u)\hat{e}_{ep}$" represents a luminance gradient in the epipolar line direction. Particularly, in the case where the u axis is parallel to the epipolar line, the luminance gradient only in the u-axis direction is used. According to the relational expression (112), the luminance residual error ΔI is able to be computed for a case where the distance residual error ΔZ=Zs−Zc exists.

The relational expression (112) represents that the parallax residual error Δu, which is a deviation between the pixel position obtained by projecting "s" of the standard image sensor C1 (the pixel position in the standard image coordinate system) into the reference image sensor C2 according to the distance measured value Ds and the pixel position obtained by projecting "s" of the standard image sensor C1 into the reference image sensor C2 according to the distance candidate value Dc, is transformed to a luminance residual error (a deviation in the specified physical quantity) conforming to the restraint condition that the specified physical quantities (luminance in this specification) imaged at the same place and at the same clock time by the standard image sensor C1 and the reference image sensor C2 are identical.

The first processing element 11 may be used to compute the luminance residual error ΔI as the first deviation $e_1$ according to the relational expression (112).

The parallax residual error Δu is expressed by a relational expression (113) by transforming the relational expression (111) according to the relational expressions Δu=(du/dZc)ΔZ and ΔZ=Zs−Zc.

$$\Delta u=-(L/Zc^2)(Zs-Zc) \qquad (113)$$

According to the relational expression (113), in the case where the virtual point distance Zc is defined as an object point distance Z, the parallax residual error Δu includes a term proportional to a power of an inverse number (1/Z) of the object point distance Z. Thus, it is possible to cause the dependence of the first cost function $f_1$ in the relational expression (11) on the object point distance Z to be partially identical or approximate to the dependence of the parallax residual error Δu on the object point distance Z. Therefore, it is understood that the first cost function $f_1$ is defined in an appropriate form in view of the geometric arrangement relationship of the standard image sensor C1, the reference image sensor C2, the position of the real point Ps, and the position of the virtual point Pc, which uniquely determines the parallax residual error Δu.

The first cost function $f_1$ may be a multivariate function with the accuracy $r_1$ of the distance measured value Ds acquired by the range image sensor C0 as a variable, in addition to the first deviation $e_1$ or the first deviation $e_1$ and the object point distance Z as variables. The first cost function $f_1$ is defined as a continuous or stepwise decreasing function with respect to the accuracy The accuracy $r_1(s)$ is defined as an increasing function of a received light intensity of the range image sensor C0. Specifically, the higher the received light intensity of the range image sensor at a pixel position in the primary range image coordinate system is, the received light intensity serving as a basis for the pixel value of the pixel position s in the range image coordinate system, the more the value of the accuracy $r_1(s)$ increases. In this case, the first cost function $f_1$ is defined according to, for example, any one of the following relational expressions (12) to (15):

$$f_1(e_1, Z, r_1) = E_s h_1(r_1(s)) g_1(Z(s)) e_1^2(s),$$

$$h_1(r_1) = 1/r_1^n (n>0: \text{for example}, n=1)$$

$$f_1(e_1, Z, r_1) = h_1(\Sigma_s r_1(s)/N) \Sigma_i g_1(Z(s)) e_1^2(s), \quad (12)$$

$h_1(r_1) = 1/r_1^n (n>0: \text{for example}, n=1, \text{and } \Sigma_s r_1(s)/N$ is an average value of the accuracy $r_1$ of a pixel group belonging to the object region) (13)

$$f_1(c_1, r_1) = \Sigma_s h_1(r_1(s)) c_1^2(s) \quad (14)$$

$$f_1(e_1, r_1) = h_1(E_s r_1(s)/N) \Sigma_i e_1^2(s) \quad (15)$$

The second processing element 12 generates a transformed image by coordinate-transforming the reference image into the standard image coordinate system under the assumption that the standard image sensor C1 and the reference image sensor C2 have imaged the same virtual surface (STEP 012 in FIG. 2). To be more specific, an image is acquired as a transformed image where the luminance in the pixel position $s_2$ in the case of existence of parallax depending on the position and posture of the virtual surface in the reference image coordinate system is assigned to the pixel position $s_1$ in the standard image coordinate system.

The second processing element 12 calculates "second cost" according to the second cost function $f_2$ on the basis of the second deviation $e_2$ as a deviation of the pixel value in the same pixel position s between the standard image coordinate system and the transformed image coordinate system (STEP 014 in FIG. 2).

The second cost function $f_2$ is a continuous or stepwise increasing function with the second deviation $e_2$ as a variable. More specifically, the relational expression $(\partial f_2/\partial e_2)>0$ or $f_2(e_2+\delta e_2)-f_2(e_2)>0 (\delta e_2>0)$ is satisfied. The second cost function $f_2$ is defined according to, for example, the relational expression (20).

$$f_2(e_2) = \Sigma_s e_2^2(s) \quad (20)$$

The second deviation $e_2$ is a function with the plane parameter $\hat{q} = \hat{n}/d$ of the virtual surface as a variable. Therefore, the second cost computed on the basis of the second deviation $e_2$ is also a function with the plane parameter $\hat{q}$ of the virtual surface as a variable.

The second cost function $f_2$ may be a multivariate function with the accuracy $r_2$ of a pixel value, which is acquired by at least one of the standard image sensor C1 and the reference image sensor C2, as a variable, in addition to the second deviation $e_2$ or the second deviation $e_2$ and the object point distance Z as variables. The second cost function $f_2$ is defined as a continuous or stepwise decreasing function with respect to the accuracy $r_2$.

The accuracy $r_2(s)$ is defined as a function which is determined to be high or low according to, for example, a criteria of whether or not the derivative value of a pixel is a characteristic value. In this case, the second cost function $f_2$ is defined according to, for example, relational expression (21) or (22).

$$f_2(e_2, r_2) = \Sigma_s h_2(r_2(s)) e_2^2(s),$$

$$h_2(r_2) = 1/r_2^m (m>0: \text{for example}, m=1)$$

$$f_2(e_2, r_2) = h_2(\Sigma_s r_2(s)/M) \Sigma_s e_2^2(s), \quad (21)$$

$h_2(r_2) = 1/r_2^m (m>0: \text{for example}, m=1, \text{and } \Sigma_s r_2(s)/M$ is an average value of the accuracy $r_2$ of a pixel group belonging to the object region of the standard image sensor or a region corresponding thereto in the reference image sensor) (22)

The accuracy $r_2(s)$ may be set to a positive predetermined value which is determined in advance in the case where the gradient of luminance which is a pixel value is equal to or lower than the standard value.

The third processing element 13 explores the virtual surface according to the least-squares method so that the total cost C acquired by adding the first cost to the second cost approaches the minimum value (STEP 016 in FIG. 2). Thereby, the position and posture of the surface of the subject are estimated. As described above, the first cost and the second cost are both functions with the plane parameter $\hat{q}$ of the virtual surface as a variable. Therefore, as expressed by a relational expression (31) or (32), the total cost C is also defined as a function $C(\hat{q})$ of the plane parameter $\hat{q}$. This (the total cost C) represents a divergence in an object region between the standard image and the reference image.

$$C(\hat{q}) = f_1(\hat{q}) + f_2(\hat{q}) \quad (31)$$

$$C(\hat{q}) = \alpha f_1(\hat{q}) + (1-\alpha) f_2(\hat{q}), (0<\alpha<1) \quad (32)$$

Moreover, the luminance residual error $\Delta I$ is associated with the distance residual error $\Delta Z$ by the relational expressions (112) and (113). This enables the first deviation $e_1$ to be represented in the same dimension by the luminance residual error $\Delta I$ in an appropriate form in view of the geometric arrangement relationship. Alternatively, the above enables the second deviation $e_2$ to be represented in the same dimension by the distance residual error $\Delta Z$ in an appropriate form in view of the geometric arrangement relationship.

Then, the plane parameter $\hat{q}$, which minimizes the total cost C, is explored according to the gradient method which varies the plane parameter of the virtual surface by the amount depending on $(\partial C(\hat{q})/\partial \hat{q})$.

Whether or not the exploring the virtual surface ends is determined according to whether or not the plane parameter $\hat{q}$ satisfies a certain convergence condition such that a difference between the previous value and the current value of the total cost is equal to or lower than a threshold value (STEP 018 in FIG. 2). If the determination result is negative (NO in STEP 018 in FIG. 2), the current plane parameter $\hat{q}(k+1)$ is set as a result of updating the previous plane parameter $\hat{q}(k)$ (k is an exponent indicating the update frequency of the plane parameter) according to the gradient method (STEP 008 in FIG. 2). Based on the above, the aforementioned series of processes are repeated (STEP 010 to STEP 018 in FIG. 2).

On the other hand, if the determination result is affirmative (YES in STEP 018 in FIG. 2), the third processing element 13 estimates the position and posture of the virtual surface defined by the plane parameter $\hat{q}$ at that time point as the position and posture of the surface of the subject (STEP 020 in FIG. 2).

Figure 6A:
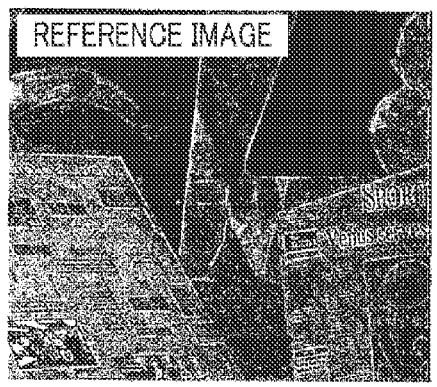
FIGS. 6A, 6B, and 6C are explanatory diagrams of environment recognition results.
Figure 6B:
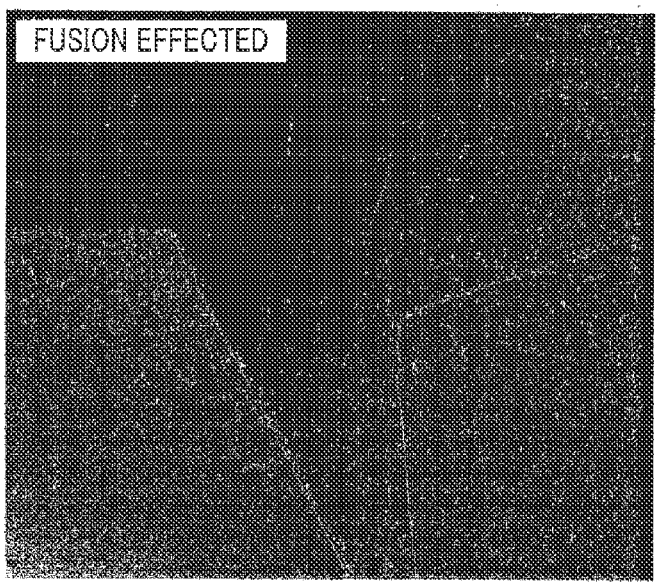
Figure 6C:
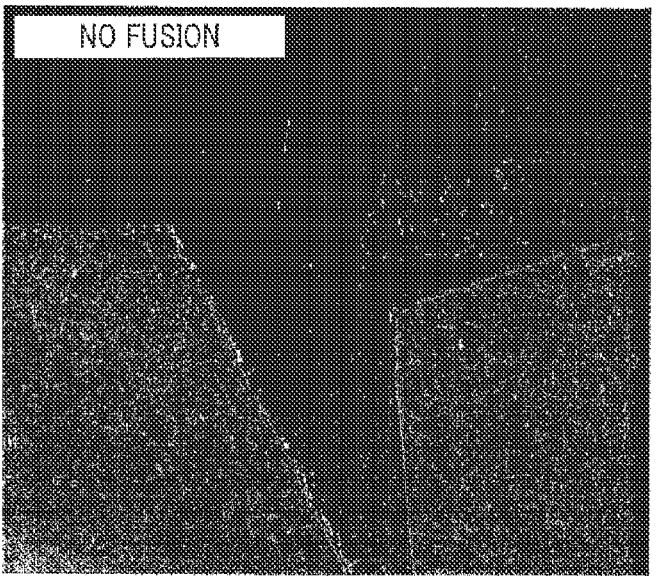

FIG. 6A illustrates an example of a standard image, a reference image, and a range image having a distance true value as a pixel value, starting from the left. In the range image, the greater the distance which is the pixel value is, the lower the brightness is, and the smaller the distance which is the pixel value is, the higher the brightness is. FIG. 6B illustrates a range image acquired by an environment recognition method of the present invention. Meanwhile, FIG. 6C illustrates a range image acquired by applying the method disclosed in Non-patent Document 1, which is a conventional technique, to luminance information acquired by a stereo camera.

The object surfaces contained in the standard image and the reference image are substantially flat in practice (See FIG. 6A). According to the conventional technique, however, an acquired range image shows that the object surface has relatively large irregularities resulting from the existence of characters or images on the surface (See FIG. 6C). On the other hand, according to the present invention, the object surface is substantially flat though the object surface has small irregularities and thus a range image approximate to the actual state is acquired, from which it is understood that the environment recognition accuracy is improved (See FIG. 6B).

In addition, a color (RGB value) acquired by a visible light camera, a temperature acquired by an infrared camera, or any other physical quantity other than the luminance acquired by the visible light camera may be used as the specified physical information to estimate the range image.

According to the environment recognition apparatus 1 of the present invention, the first cost function is defined as a decreasing function of the object point distance Z. Therefore, the longer the object point distance Z is, the smaller the first cost of the pixel is evaluated (See the relational expressions (11) to (15)). This reduces the contribution of the first cost of a pixel highly probable to have a large measurement or estimation error in the object point distance Z to the total cost C. Thereby, the estimation accuracy of the plane parameter $\hat{q}$ representing the surface position and posture of the subject is improved.

Furthermore, the total cost C is computed on the basis of a square sum of the first deviation $e_1$, a power of an inverse number (1/Z) of the object point distance Z, and a square sum of the second deviation $e_2$ (See the relational expressions (10) to (15) and the relational expressions (20) to (22)). Accordingly, comparing with the case where the evaluation function is a logarithm function or an exponent function of the residual error (for example, refer to expression (5) in Non-patent Document 2), the computational amount of the total cost is able to be reduced so as to improve the computational speed.

DESCRIPTION OF REFERENCE NUMERALS

1 Environment recognition apparatus
11 First processing element
12 Second processing element
13 Third processing element
C0 Range image sensor
C1 Standard image sensor
C2 Reference image sensor

What is claimed is:

1. An environment recognition apparatus which estimates a position and a posture of a surface of a subject by using:
a range image sensor configured to measure a distance up to the subject;
a standard image sensor configured to acquire a standard image composed of a plurality of pixels each having a specified physical quantity of the subject as a pixel value by imaging the subject; and
a reference image sensor configured to acquire a reference image composed of a plurality of pixels each having the specified physical quantity of the subject as a pixel value by imaging the subject,
the environment recognition apparatus comprising:
a first processing element configured to calculate first cost using a first cost function defined as a multivariate function which is an increasing function with respect to a first deviation and a decreasing function with respect to an object point distance, for each pixel belonging to the object region which is at least a part of the standard image, on the basis of the first deviation, which is determined according to the length of an interval between a real point whose position is measured by the range image sensor as a distance measured value and a virtual point as a result of projecting the real point onto a virtual surface with respect to an eye direction of the standard image sensor, and the object point distance, which is a distance between the standard image sensor and an object point which is one of the real point and the virtual point with respect to an optical axis direction of the standard image sensor;
a second processing element configured to calculate second cost using a second cost function which is an increasing function with respect to a second deviation, for each pixel belonging to the object region of the standard image, on the basis of the second deviation as a deviation between the pixel value of the pixel in the standard image and the pixel value of the pixel in the reference image and the pixel value of the pixel of the reference image corresponding to the pixel of the standard image according to the position and posture of the virtual surface; and
a third processing element configured to estimate the position and posture of the surface of the subject by exploring the virtual surface so that total cost which is a total sum of the first cost and the second cost with respect to each pixel belonging to the object region of the standard image is brought close to the minimum value of the total cost.

2. The environment recognition apparatus according to claim 1, wherein:
the first cost function is defined as a decreasing function with respect to an accuracy of a measurement of a distance up to the subject obtained by the range image sensor; and
the first processing element is configured to recognize the accuracy of the measurement of the distance and to calculate the first cost on the basis of the first deviation, the object point distance, and the accuracy, according to the first cost function.

3. The environment recognition apparatus according to claim 1 wherein:
the second cost function is defined as an increasing function with respect to an accuracy of a measurement of a pixel value obtained by at least one of the standard image sensor and the reference image sensor; and
the second processing element is configured to recognize the accuracy of the measurement of the pixel value and to calculate the second cost on the basis of at least the second deviation and the accuracy, according to the second cost function.

4. The environment recognition apparatus according to claim 1, wherein the third processing element is configured to estimate the position and posture of the surface of the subject according to a least-squares method.

5. An environment recognition apparatus which estimates the position and posture of a surface of a subject by using:
a range image sensor configured to measure a distance up to the subject;
a standard image sensor configured to acquire a standard image composed of a plurality of pixels each having a specified physical quantity of the subject as a pixel value by imaging the subject; and
a reference image sensor configured to acquire a reference image composed of a plurality of pixels each having the specified physical quantity of the subject as a pixel value by imaging the subject,
the environment recognition apparatus comprising:
a first processing element configured to compute a first deviation on the basis of a parallax residual error, which is a deviation between a pixel position obtained by projecting the pixel position of the standard image sensor corresponding to the distance measured value onto the reference image sensor and a pixel position obtained by projecting the pixel position of the standard image sensor corresponding to a distance candidate value onto the reference image sensor, according to a restraint condition that the specified physical quantity acquired by the standard image sensor and the reference image sensor at the same position on the image is identical, with respect to each of a plurality of pixel positions of a range image acquired by the range image sensor;

a second processing element configured to acquire the pixel value of a pixel in the reference image corresponding to a pixel in the standard image according to the parallax, and to compute a second deviation of the specified physical quantity which is a pixel value of each of a plurality of pixels in the standard image and the reference image, based on the assumption that the standard image sensor and the reference image sensor have parallax according to the distance candidate value; and a third processing element configured to compute a divergence between the standard image and the reference image on the basis of the first deviation computed by the first processing element and the second deviation computed by the second processing element and to estimate the distance candidate value among a plurality of the distance candidate values, that minimizes the divergence as a distance true value at each pixel of the range image.

6. The environment recognition apparatus according to claim 5, wherein the first processing element computes the first deviation by performing a transformation from the parallax residual error to a deviation in the specified physical quantity.

7. The environment recognition apparatus according to claim 6, wherein the first processing element computes the first deviation by performing the transformation through multiplying the parallax residual error by a gradient of the specified physical quantity along the epipolar line direction.

* * * * *